US012638313B2

(12) United States Patent
Shim et al.

(10) Patent No.: US 12,638,313 B2
(45) Date of Patent: *May 26, 2026

(54) OPTICAL ENCODING SYSTEM COMPENSATING ASSEMBLY TOLERANCE

(71) Applicant: PixArt Imaging Inc., Hsin-Chu County (TW)

(72) Inventors: Kuan-Choong Shim, Penang (MY); Meng-Yee Lim, Penang (MY); Priscilla Tze-Wei Goh, Penang (MY); Gim-Eng Chew, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 86 days.

This patent is subject to a terminal disclaimer.

(21) Appl. No.: 18/677,941

(22) Filed: May 30, 2024

(65) Prior Publication Data

US 2024/0361158 A1     Oct. 31, 2024

Related U.S. Application Data

(63) Continuation of application No. 18/307,801, filed on Apr. 27, 2023, now Pat. No. 12,025,476.

(51) Int. Cl.
*G01D 5/347* (2006.01)
*G01D 18/00* (2006.01)

(52) U.S. Cl.
CPC ....... *G01D 5/34723* (2013.01); *G01D 5/3473* (2013.01); *G01D 18/001* (2021.05); *G01D 2205/20* (2021.05)

(58) Field of Classification Search
CPC ..... G01D 5/3473; G01D 18/00; G01D 18/001
See application file for complete search history.

(56) References Cited

U.S. PATENT DOCUMENTS 12,025,476 B1 * 7/2024 Shim ................. G01D 5/34723

* cited by examiner

*Primary Examiner* — Thanh Luu
(74) *Attorney, Agent, or Firm* — WPAT, PC

(57) ABSTRACT

There is provided an optical encoding system including a photodiode array and a code disk opposite to each other. The photodiode array includes a detection photodiode group and a calibration photodiode group. If there is a position deviation between the photodiode array and the code disk, whether to utilize detection signals of the calibration photodiode group is determined according to phase shifts between detection signals outputted by the detection photodiode group so as to eliminate the phase shifts.

20 Claims, 12 Drawing Sheets

300

OPTICAL ENCODING SYSTEM COMPENSATING ASSEMBLY TOLERANCE

CROSS-REFERENCE TO RELATED APPLICATIONS

The present application is a continuation application of U.S. application Ser. No. 18/307,801, filed on Apr. 27, 2023, the disclosure of which is hereby incorporated by reference herein in its entirety.

FIELD OF THE DISCLOSURE

This disclosure generally relates to an optical encoding system and, more particularly, to an optical encoding system and an operating method thereof that can mitigate the phase shift between detection signals caused by position deviations in assembling.

BACKGROUND OF THE DISCLOSURE

The optical rotation encoder can be adapted to detect an absolute position or a relative position of unlimited rotating shaft. The relative position encoder can be adapted to an application such as an optical mouse. The absolute position encoder can be adapted to applications such as an aerospace camera and a robotic system.

The optical rotation encoder generally includes a code disk and a photodiode array. The photodiode array has an incremental photodiodes for receiving modulated light from the code disk to output differential quadrature signals having 90-degree phase shift from one another to confirm a relative position change. In order to confirm an absolute position at the same time, the photodiode array further includes another photodiode group for outputting detection signals, which are used in conjunction with the maximum length sequence (MLS) code to determine a rotation angle of the code disk.

However, in assembling the optical rotation encoder, the assembly error can occur to induce the phase shift(s) between the detection signals. For example, FIG. 1A is a schematic diagram of modulated light impinging on a photodiode diode array 11 when there is no position deviation between the code disk and the photodiode diode array 11, wherein the photodiode diode array 11 is shown to include nine photodiodes C1 to C9; and reference numerals 13*b* and 13*d* respectively indicate bright zones and dark zones of modulated light from the code disk.

When there is no significant assembly error between the code disk and the photodiode array 11, detection signals Sc1 to Sc9 of the photodiodes C1 to C9 do not have a phase shift therebetween, e.g., referring to FIG. 1B.

However, if there is the assembly error between the code disk and the photodiode array 11, phase shifts occur between the detection signals Sc1 to Sc9 of the photodiodes C1 to C9. For example referring to FIG. 2A, it shows that impinging light zones have a small magnification factor such that the bright zones 13*b* and the dark zones 13*d* of modulated light are smaller than sensing surfaces of the photodiodes C1 to C9, wherein phase shifts between the detection signals Sc1 to Sc9 are shown in FIG. 2C. Referring to FIG. 2B, it shows that impinging light zones have a large magnification factor such that the bright zones 13*b* and the dark zones 13*d* of modulated light are larger than the sensing surfaces of the photodiodes C1 to C9, wherein phase shifts between detection signals Sc1 to Sc9 are shown in FIG. 2D.

In the case that the detection signals of the photodiodes C1 to C9 are used as absolute position signals, this kind of phase shifts can lead to code error, or called absolute code jump.

Accordingly, it is required to provide an optical encoding system capable of mitigating or even eliminating the phase shift between detection signals caused by the assembling error.

SUMMARY

The present disclosure provides an optical encoding system with photodiodes transversally divided into multiple sub-regions such that when a phase shift between detection signals exceeds a predetermined threshold, the currently operating photodiodes are switched to different sub-regions so as to match modulated light zones thereby eliminating phase shifts caused by the position deviation in assembling.

The present disclosure further provides an optical encoding system with longitudinally arranged multiple photodiode arrays such that when a phase shift between detection signals exceeds a predetermined threshold, the currently operating photodiodes are switched to different combinations among the multiple photodiode arrays so as to match modulated light zones thereby eliminating phase shifts caused by the position deviation in assembling.

The present disclosure provides an optical encoding system including a code disk, a photodiode array and multiple switching devices. The code disk is arranged with equally-spaced multiple code slits along a tangential direction. The photodiode array includes multiple groups of detection photodiodes and two groups of calibration photodiodes respectively at two sides of the multiple groups of detection photodiodes in the tangential direction, wherein the multiple groups of detection photodiodes are respectively configured to receive modulated light from the multiple code slits to generate a detection signal as absolute position signals. The multiple switching devices are configured to switch the multiple groups of detection photodiodes to output multiple detection signals in a first detection, and to switch the two groups of calibration photodiodes to output other detection signals according to phase shifts between the multiple detection signals in the first detection.

The present disclosure further provides an optical encoding system including a first photodiode array, a second photodiode array, a third photodiode array and a processor. The first photodiode array has a first width in a first direction, and is used to generate multiple detection signals as absolute position signals. The second photodiode array has a second width in the first direction, and is arranged at a first side of the first photodiode array in a second direction perpendicular to the first direction, wherein the second width is smaller than the first width. The third photodiode array has a third width in the first direction, and is arranged at a second side of the first photodiode array in the second direction, wherein the third width is larger than the first width. In a first detection the first photodiode array is configured to output the multiple detection signals, and in a second detection the second photodiode array or the third photodiode array is configured to output other detection signals according to phase shifts between the multiple detection signals in the first detection.

The present disclosure further provides an optical encoding system including a code disk, multiple detection photodiodes, multiple calibration photodiodes and multiple switching devices. The code disk is arranged with equally-spaced multiple code slits along a tangential direction. The multiple detection photodiodes respectively receive modulated light from the multiple code slits to generate a detection signal as absolute position signals. The multiple switching devices are configured to switch the multiple calibration photodiodes to output other detection signals according to phase shifts between multiple detection signals generated by the multiple detection photodiodes.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

The present disclosure provides an optical encoding system in which extra calibration photodiodes are arranged, in addition to detection photodiodes, for calibrating the phase shift between detection signals (e.g., served as code signals) caused by assembling error (especially deviations in a radial direction and a longitudinal direction) of the optical encoding system. The present disclosure can be adapted to both the transmission-type optical encoding system and the reflection-type optical encoding system.

Figure 3A:
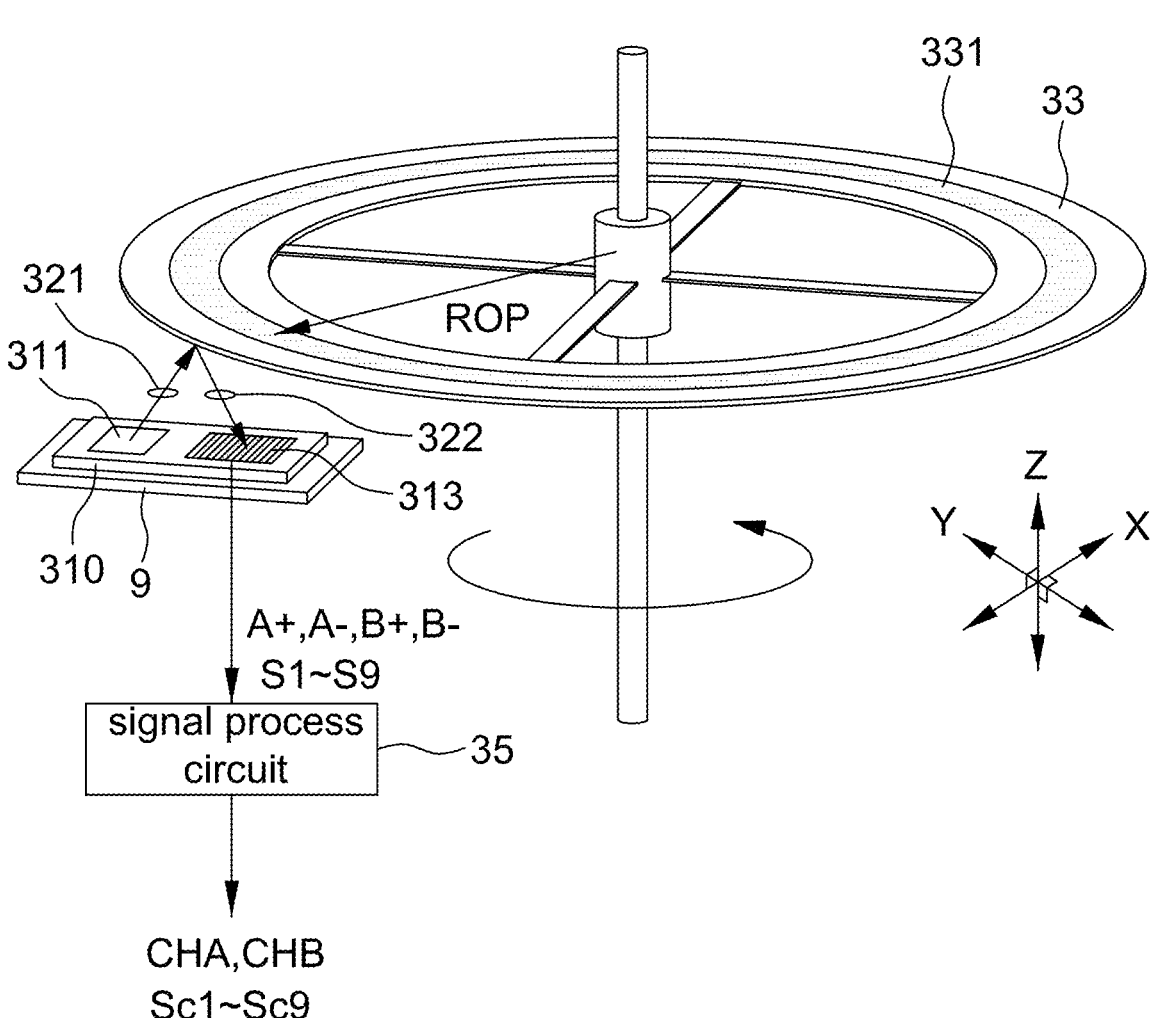
FIG. 3A is a schematic diagram of an optical encoding system according to one embodiment of the present disclosure.
Figure 3B:
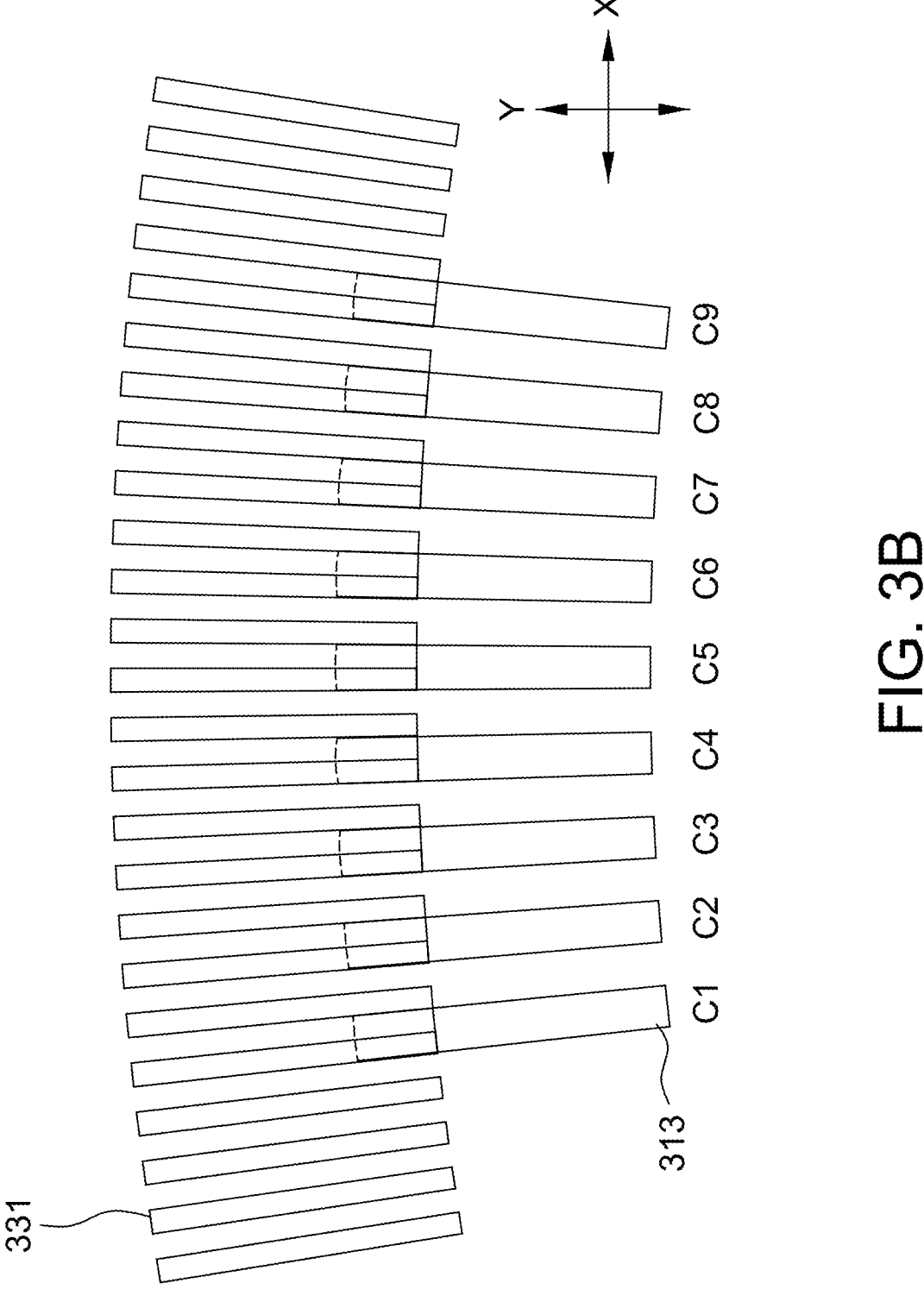
FIG. 3B is a partially enlarged schematic diagram of the optical encoding system in FIG. 3A.

Please refer to FIG. 3A, it is a schematic diagram of an optical encoding system 300 according to one embodiment of the present disclosure. The optical encoding system 300 is illustrated by a reflection-type optical encoding system as an example, but the present disclosure is not limited thereto. The optical encoding system 300 includes a sensing chip 310 arranged on a substrate 9, and a code disk 33 opposite to the sensing chip 310, wherein a plurality of code slits 331 are arranged on the code disk 33 in a ring with equal-space. In the present disclosure, the code slits 331 include relative position slits (or called AB slits) and absolute position slits at two tracks. The arrangement of the relative position slits are known to the art and not a main objective of the present disclosure, and thus details thereof are not described herein. The present disclosure is illustrated by using the absolute position slits of the code slits 331, as shown in FIG. 3B. The relative position slits are arranged in another track on the code disk 33 and not shown in FIG. 3B. In FIG. 3B, the reference numerals C1 to C9 indicate a photodiode array, which is an array 313 and 313' shown in FIG. 5A or FIG. 6.

The code disk 33 is controlled, for example, by a motor to rotate clockwise or counter clockwise, but the present disclosure is not limited thereto. In a different application, the code disk 33 is implemented as a code stripe that has linear movement with respect to the sensing chip 310.

In FIG. 3A, a tangential direction of the code disk 33 is shown as an X-direction, a radial direction of the code disk 33 is shown as a Y-direction, and a Z-direction is a longitudinal direction of the system.

The sensing chip 310 includes a light source 311 and a photodiode array 313. The light source 311 is, for example, a light emitting diode or a laser diode, and is used to emit light of an identifiable spectrum (e.g., infrared light, but not limited to) to illuminate the code slits 331 on the code disk 33 via a lens 321. In the reflection-type optical encoding system, the code slits 331 modulate incident light to generate reflected light (or called modulated light herein) propagating to the photodiode array 313 via another lens 322. In the transmission-type optical encoding system, the light source 311 and the photodiode array 313 are respectively arranged at two opposite sides of the code disk 33.

It should be mentioned that although FIG. 3A shows that the lenses 321 and 322 are separated from the sensing chip 310, it is only intended to illustrate but not to limit the present disclosure. In other aspects, the lenses 321 and/or 322 are arranged inside the sensing chip 310 to adjust (e.g., directing and zooming) light paths.

In the present disclosure, the photodiode array 313 includes a relative position photodiode array corresponding to relative position slits for receiving modulated light from the relative position slits to generate four differential quadrature signals A+, A−, B+ and B−. The photodiode array 313 further includes an absolute position photodiode array corresponding to absolute position slits for receiving modulated light from the absolute position slits to generate detection signals, described hereinafter. The method of generating the four differential quadrature signals A+, A−, B+ and B− using the relative position slits may be referred to U.S. patent application No. U.S. Ser. No. 17/970,566, entitled "OPTICAL ENCODING SYSTEM WITH REDUCED TOTAL HARMONIC DISTORTION" filed on Oct. 21, 2022, assigned to the same assignee of the present application, and the full disclosure of which is incorporated herein by reference, and thus details thereof are not described herein.

Please refer to FIG. 3B, it is a partially enlarged schematic diagram of an optical encoding system 300 according to one embodiment of the present disclosure. For illustration purposes, FIG. 3B shows absolute position slits as the code slits 331 as well as the absolute position photodiode array as the photodiode array 313, but omits relative position slits and the relative position photodiode array. In one aspect, the code disk 33 is formed with a circle of code slits 331 on the code disk 33 as shown in FIG. 3A. For example, FIG. 3B shows that the absolute position photodiode array (or abbreviated as photodiode array) 313 includes nine photodiodes C1 to C9 for generating detected light energy S1 to S9.

Figure 1A:
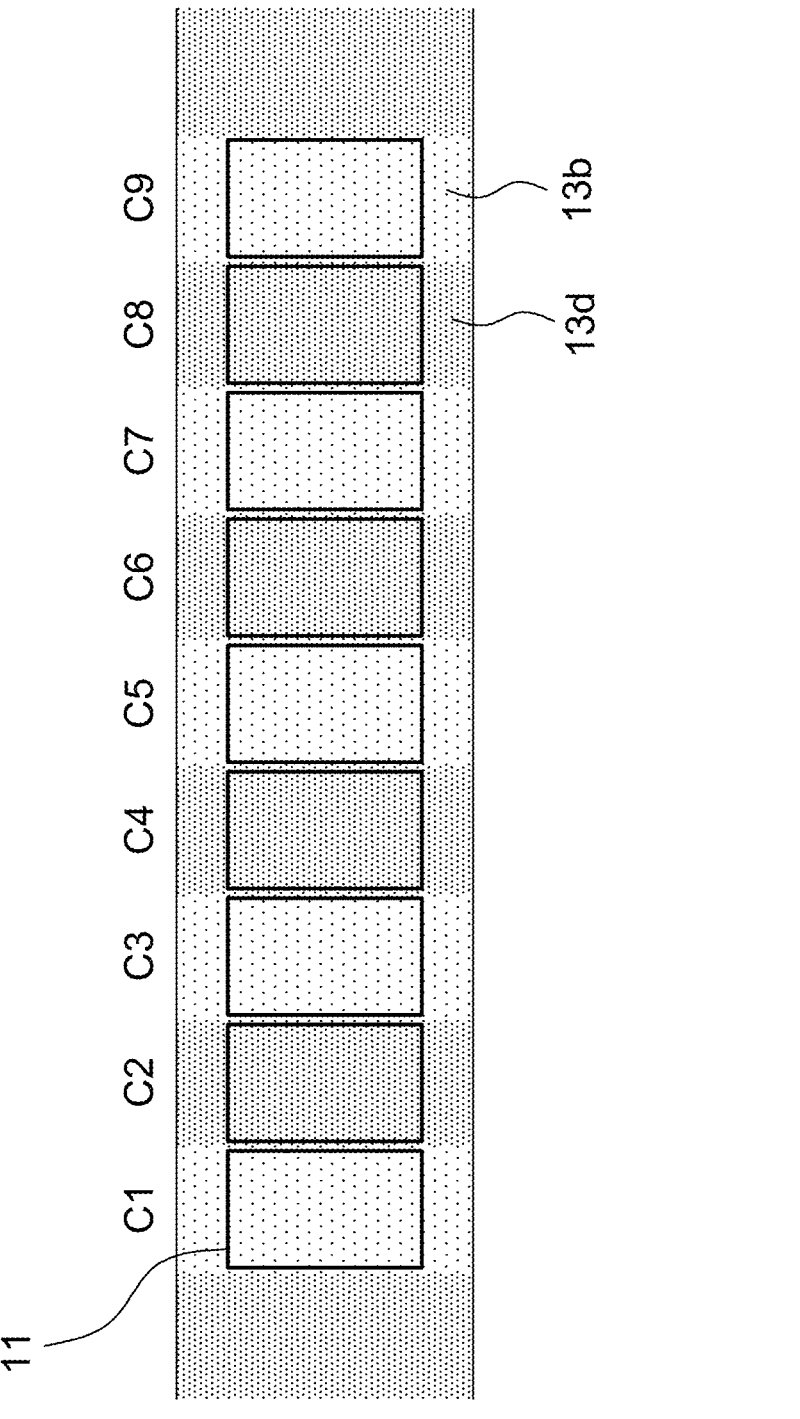
FIG. 1A is a schematic diagram of the position relationship between a photodiode array and modulated light zones when there is no position deviation in assembling an optical encoding system.
Figure 1B:
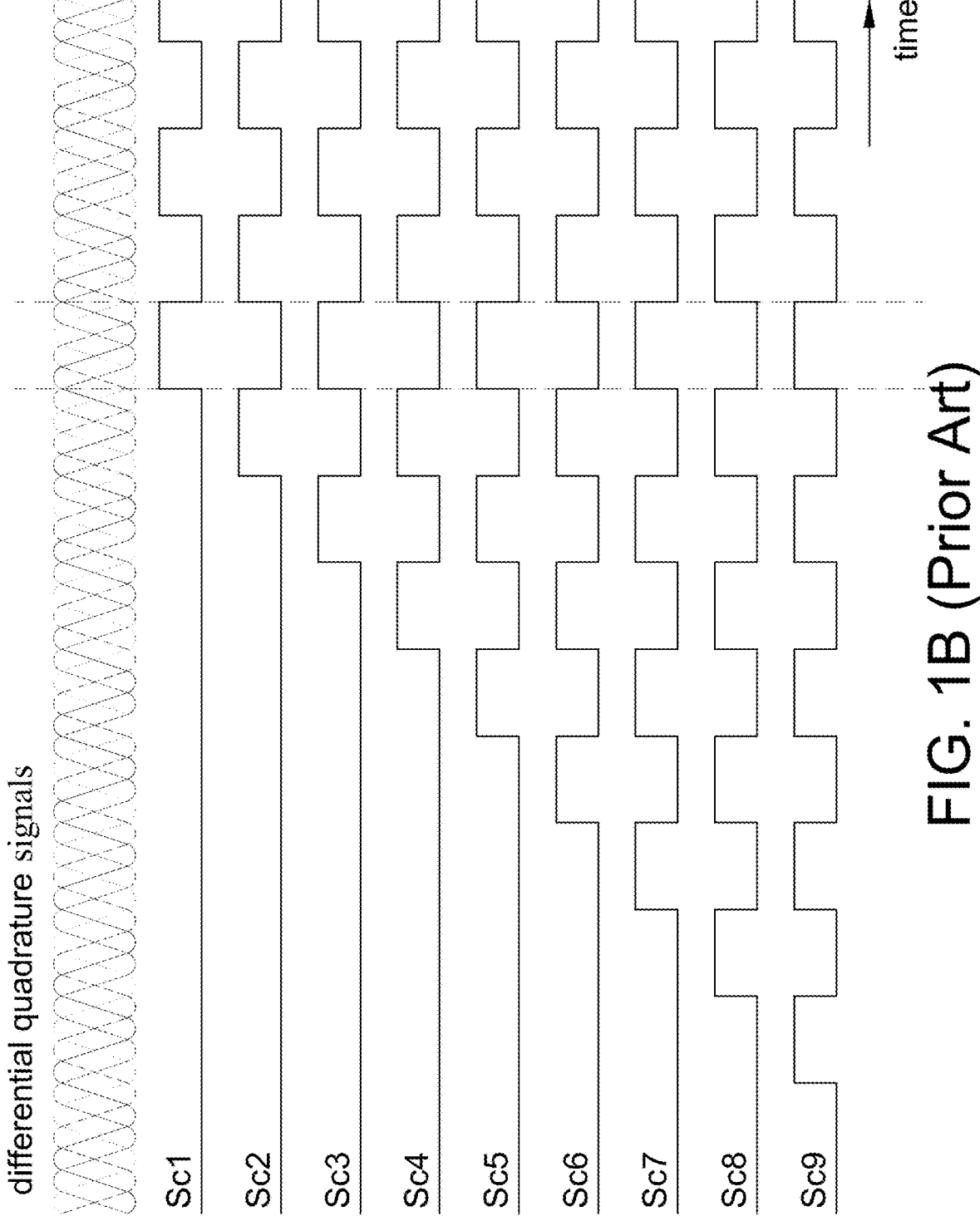
FIG. 1B is a timing diagram of quadrature signals outputted by a position photodiode array and code signals outputted by a coding photodiode array of the optical encoding system in FIG. 1A.

In addition to generating two channel signals CHA and CHB according to the differential quadrature signals A+, A−, B+ and B− for the downstream circuit to identify the rotating angle variation of the code disk 33, the signal process circuit 35 further compares the detected light energy S1 to S9 from the photodiode array 313 with respective thresholds (corresponding to each of the photodiodes C1 to C9) to generate detection signals Sc1 to Sc9. As shown in FIG. 1B, when the optical encoding system 300 does not have a position deviation in assembling, the detection signals Sc1 to Sc9 do not have a phase shift from one another. The signal processor circuit 35 is, for example, a digital signal processor (DSP) or an application specific integrated circuit (ASIC) or the like, but not limited thereto.

Figures 2A, 2B:
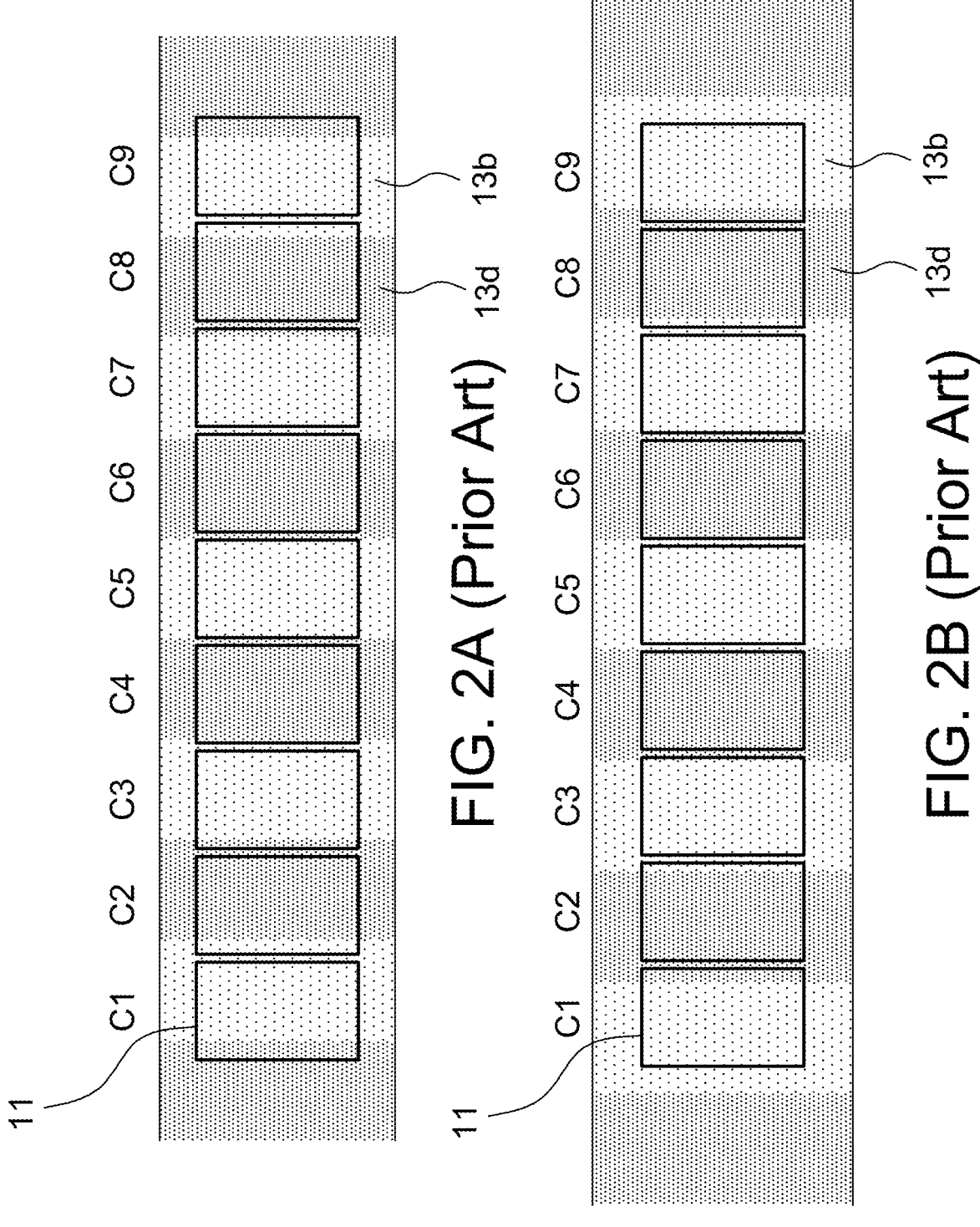
FIG. 2A is a schematic diagram of the position relationship between a photodiode array and modulated light zones when there is a first type of position deviation in assembling an optical encoding system.
FIG. 2B is a schematic diagram of the position relationship between a photodiode array and modulated light zones when there is a second type of position deviation in assembling an optical encoding system.
Figure 2C:
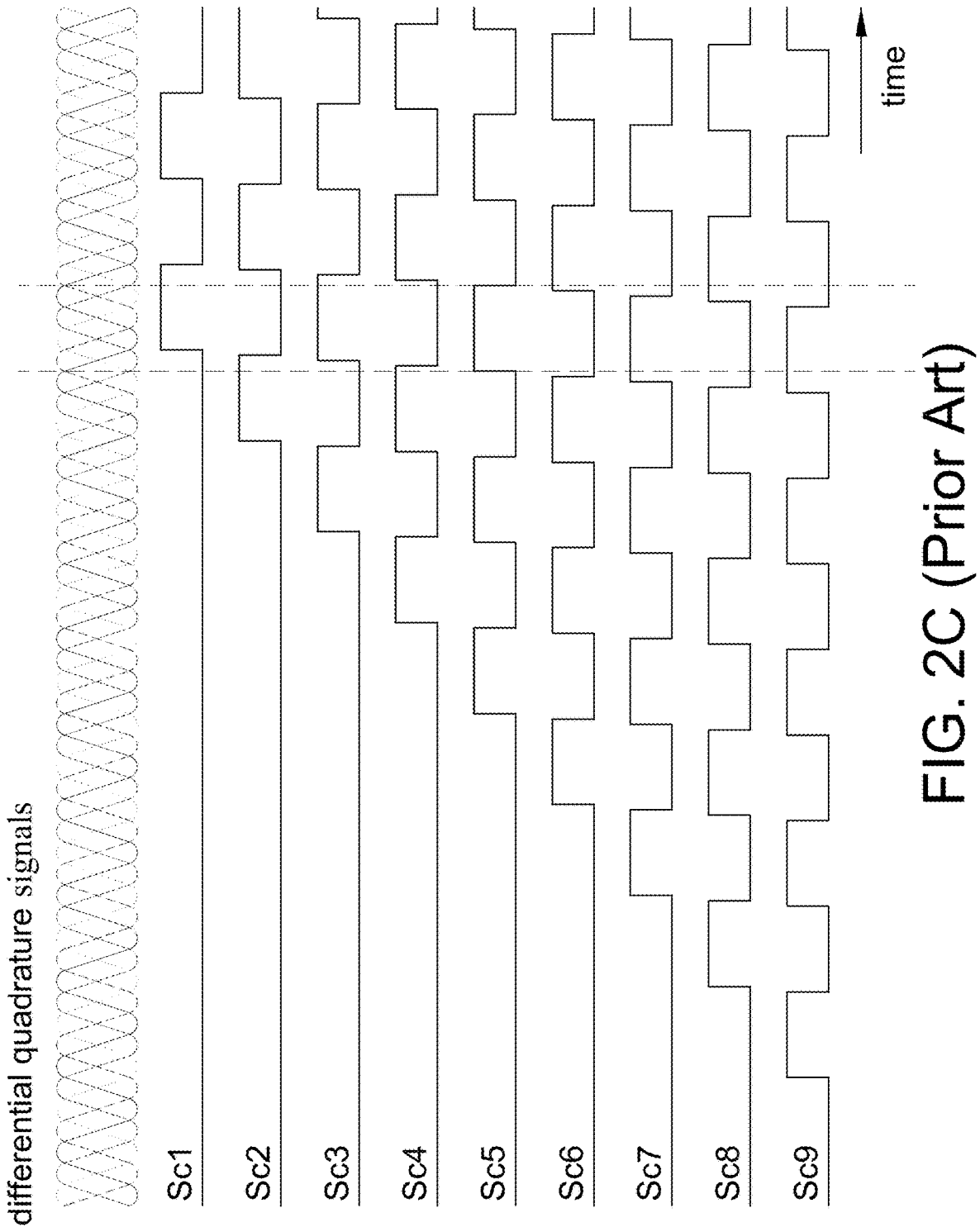
FIG. 2C is a timing diagram of quadrature signals outputted by a position photodiode array and code signals outputted by a coding photodiode array of the optical encoding system in FIG. 2A.
Figure 2D:
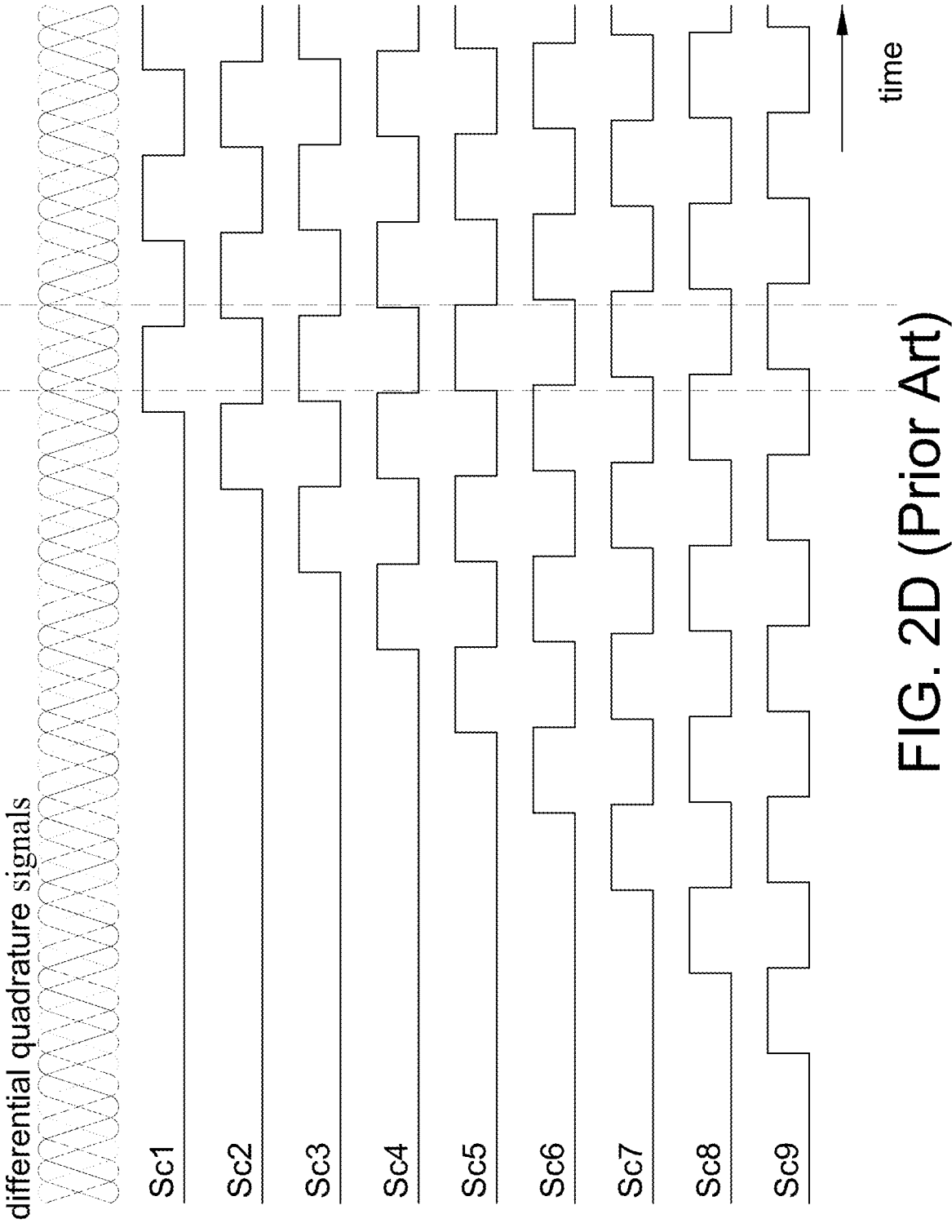
FIG. 2D is a timing diagram of quadrature signals outputted by a position photodiode array and code signals outputted by a coding photodiode array of the optical encoding system in FIG. 2B.

In one aspect, default parameters of the present disclosure are arranged as, e.g., (1) a longitudinal distance (between the code disk 33 and the sensing chip 310) Z=1.5 mm, (2) an operating radius ROP=9.15 mm, (3) a magnification factor=2.15, so as to generate detection signals Sc1 to Sc9 without a phase shift as shown in FIG. 1B. However, when the longitudinal distance Z is larger than 1.5 mm and/or the operating radius ROP is smaller than 9.15 mm, the magnification factor is decreased to obtain the result shown in FIG. 2A; or, when the longitudinal distance Z is smaller than 1.5 mm and/or the operating radius ROP is larger than 9.15 mm, the magnification factor is increased to obtain the result shown in FIG. 2B. It is seen from FIGS. 2A and 2B that the modulated light zones (including 13b and 13d) do not match the sensing area of the photodiode array 11. The embodiments of the present disclosure described below are able to reduce or even eliminate the phase shift between the detection signals Sc1 to Sc9 shown in FIGS. 2C and 2D.

Figure 4:
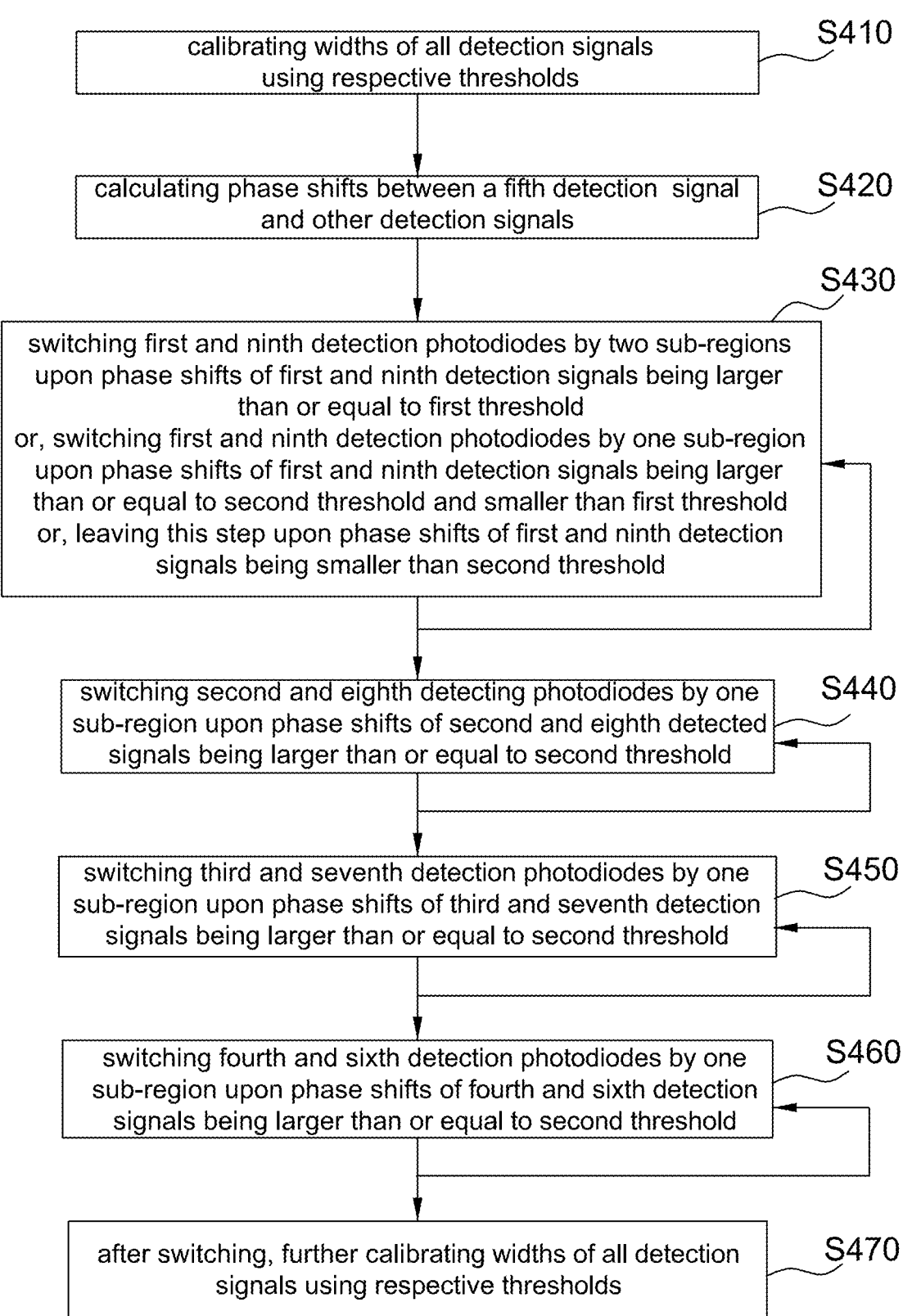
FIG. 4 is a flow chart of an operating method of an optical encoding system according to a first embodiment of the present disclosure.
Figure 5A:
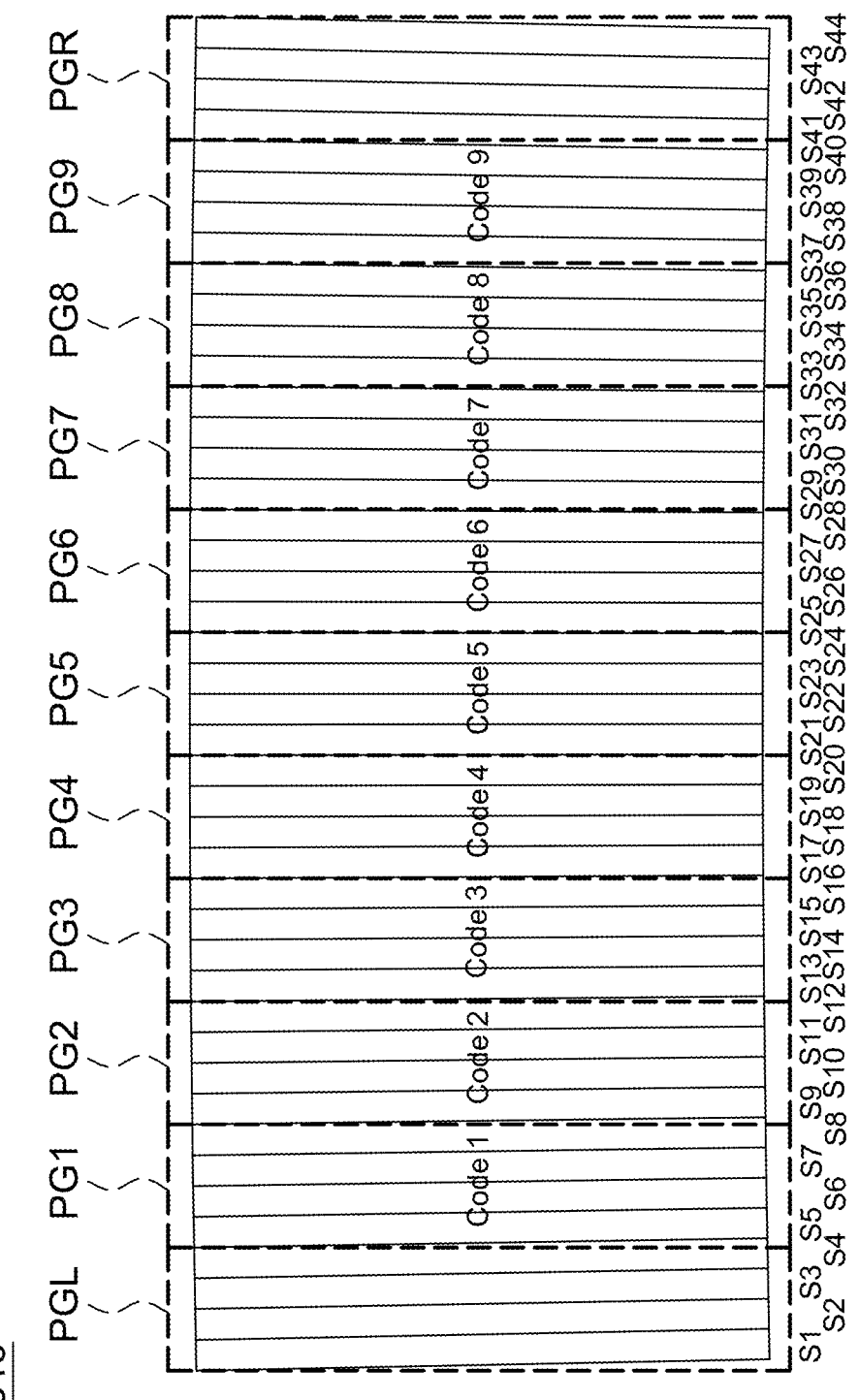
FIGS. 5A and 5B are schematic diagrams of an operating method of an optical encoding system according to a first embodiment of the present disclosure.
Figure 5B:
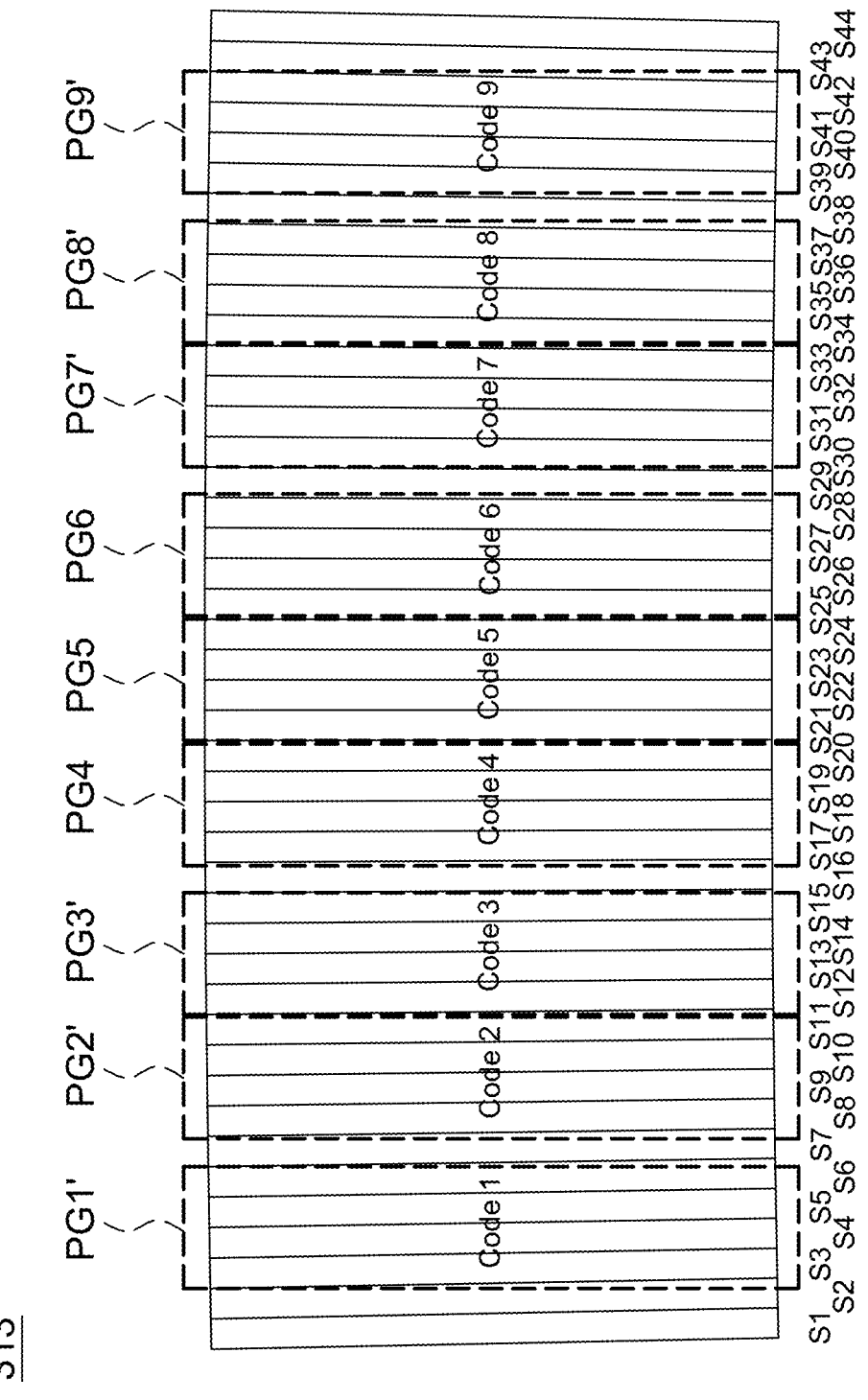

Please refer to FIG. 4 and FIGS. 5A to 5B, FIG. 4 is a flow chart of an operating method of an optical encoding system 300 according to a first embodiment of the present disclosure; and FIGS. 5A and 5B are schematic diagrams of an operating method of an optical encoding system 300 according to a first embodiment of the present disclosure, which show that the detection signals Sc1 to Sc9 are outputted by different sub-photodiodes, e.g., shown as S1 to S44.

In the first embodiment, the photodiode array 313 includes multiple groups (e.g., shown as PG1 to PG9, but not limited to 9 groups) of detection photodiodes and two groups (e.g., shown as PGL and PGR, but not limited to 2 groups) of calibration photodiodes. The two groups of calibration photodiodes PGL and PGR are respectively at two sides of the multiple groups of detection photodiodes PG1 to PG9 in the tangential direction X, e.g., referring to FIGS. 3A to 3B.

Each group of the multiple groups of detection photodiodes PG1 to PG9 and the two groups of calibration photodiodes PGL and PGR has multiple sub-photodiodes. For example, FIG. 5A shows that the group of calibration photodiode PGL includes four sub-photodiodes S1 to S4; the group of detection photodiode PG1 includes four sub-photodiodes S5 to S8; . . . ; the group of detection photodiode PG9 includes four sub-photodiodes S37 to S40; and the group of calibration photodiode PGR includes four sub-photodiodes S41 to S44. It should be mentioned that each group of the calibration photodiodes and each group of the detection photodiodes are not limited to include four sub-photodiodes, and a number of the sub-photodiodes of each group is determined according to the required detection resolution. In addition, each group of the detection photodiodes is not limited to include an identical number of sub-photodiodes as each group of the calibration photodiodes. For example, each group of the calibration photodiodes includes four sub-photodiodes, but each group of the calibration photodiodes includes two sub-photodiodes, but not limited to.

In one aspect, a width of each group of the calibration photodiodes and each group of the detection photodiodes is identical to a summation of one code slit and one slit margin. For example, a width of each of the detection photodiodes PG1 to PG9 in FIG. 5A is respectively equal to a width of each of the detection photodiodes C1 to C9 shown in FIG. 3B. In addition, the sub-photodiodes are not limited to be directly connected/adjacent to each other as shown in FIGS. 5A and 5B but with a space therebetween.

As mentioned above, the multiple groups of detection photodiodes PG1 to PG9 are respectively used to receive modulated light from the multiple code slits 331 to generate detection signals Sc1 to Sc9 (e.g., referring to FIGS. 1B and 3A) as absolute position signals. In one aspect, said absolute position signals are code signals for the MLS codes.

A processor (e.g., the signal process circuit 35 shown in FIG. 3A) is used to identify whether to switch to use the two groups of calibration photodiodes PGL and PGR according to phase shifts between the multiple detection signals Sc1 to Sc9 generated by the multiple groups of detection photodiodes PG1 to PG9.

For example, the default setting of the optical encoding system 300 is to identify the phase shifts according to detection signals of the sub-photodiodes S5 to S40 without using detection signals of the sub-photodiodes S1 to S4 and S41 to S44. Meanwhile, the default setting of the optical encoding system 300 is to generate the result shown in FIG. 2A, e.g., with the longitudinal distance Z=2.0 mm and the operating radius ROP=9.55 mm. In one aspect, switching devices are arranged between the processor 35 and the sub-photodiodes S1 to S44 such that the processor 35 determines the detection signals to be sent to the processor 35 by controlling the switching devices. In another aspect, the processor 35 receives the detection signals outputted by all sub-photodiodes S1 to S44, but utilizes a part (e.g., S5 to S40 in FIG. 5A, and S3 to S6, S8 to S15, S17 to S28, S30 to S37 and S39 to S42 in FIG. 5B) of the detection signals and ignores the rest detection signals.

In this embodiment, since each group of detection photodiodes includes multiple (e.g., shown as four) sub-photodiodes, the processor 35 further sums up light energy detected by the multiple sub-photodiodes of each group of detection photodiodes PG1 to PG9 to respectively generate the detection signals Sc1 to Sc9. In this embodiment, the phase shifts include eight phase shifts between a fifth group of detection photodiodes PG5 and the rest groups of detection photodiodes PG1 to PG4 and PG6 to PG9.

The operating method of the first embodiment includes the steps of: calibrating widths of all detection signals using respective thresholds (Step S410); calculating phase shifts between a fifth detection signal and other detection signals (Step S420); identifying whether to switch sub-regions of a first group of detection photodiodes and a ninth group of detection photodiodes (Step S430); identifying whether to switch sub-regions of a second group of detection photodiodes and an eighth group of detection photodiodes (Step S440); identifying whether to switch sub-regions of a third group of detection photodiodes and a seventh group of detection photodiodes (Step S450); identifying whether to switch sub-regions of a fourth group of detection photodiodes and a sixth group of detection photodiodes (Step S460); and after switching, further calibrating widths of all detection signals using respective thresholds (Step S470).

Please refer to FIG. 4 to FIG. 5B, details of an example of this operating method are illustrated hereinafter.

Step S410: Firstly, the processor 35 uses respective thresholds corresponding to the multiple groups of detection photodiodes PG1 to PG9 to be compared with the summed light energy of sub-photodiodes to obtain square-wave signals having identical widths as the multiple detection signals Sc1 to Sc9, e.g., referring to FIG. 1B. For example, the processor 35 compares a light energy summation of the sub-photodiodes S5 to S8 of a first group of detection photodiode PG1 with a first threshold to obtain Sc1; compares a light energy summation of the sub-photodiodes S6 to S9 of a second group of detection photodiode PG2 with a second threshold to obtain Sc2; . . . ; and compares a light energy summation of the sub-photodiodes S37 to S40 of a ninth group of detection photodiode PG9 with a ninth threshold to obtain Sc9. The widths of the square-wave signals are set as 360 mechanical degrees.

Step S420: Next, the processor 35 sequentially calculates phase shifts between a fifth detection signal Sc5 of a fifth group of detection photodiodes PG5 and other detection signals Sc1 to Sc4 and Sc6 to Sc9. In the present disclosure, the phase shifts are a mechanical degree difference (or time difference) between rising edges and/or falling edges of the multiple detection signals Sc1 to Sc9. Because the first embodiment is preset to have a small magnification factor (e.g., referring to FIG. 2A) and it is assumed that the phase shift is caused by an increment of the magnification factor, only magnitudes of the phase shifts are considered without considering the positive/negative signs of the phase shifts.

Step S430: The processor 35 moves a first group of detection photodiodes PG1 and a ninth group of detection photodiodes PG9 respectively toward the two groups of calibration photodiodes PGL and PGR by two sub-photodiodes while identifying that a first phase shift between a fifth detection signal Sc5 of the fifth group of detection photodiodes PG5 and a first detection signal Sc1 of the first group of detection photodiodes PG1 as well as an eighth phase shift between the fifth detection signal Sc5 of the fifth group of detection photodiodes PG5 and a ninth detection signal Sc9 of the ninth group of detection photodiodes PG9 are larger than or equal to a first threshold. For example, FIG. 5B shows that the first group of detection photodiodes PG1 is switched to the sub-photodiodes S3 to S6 (shown as PG1'), and the ninth group of detection photodiodes PG9 is switched to the sub-photodiodes S39 to S42 (shown as PG9'). That is, after calibration, the processor 35 calculates the first detection signal Sc1 by summing up light energy detected by the sub-photodiodes S3 to S6, and calculates the ninth detection signal Sc9 by summing up light energy detected by the sub-photodiodes S39 to S42.

On the other hand, the processor 35 moves the first group of detection photodiodes PG1 and the ninth group of detection photodiodes PG9 respectively toward the two groups of calibration photodiodes PGL and PGR by one sub-photodiode while identifying that the first phase shift as well as the eighth phase shift are smaller than the first threshold and larger than or equal to a second threshold. In this case, the first group of detection photodiodes PG1 is switched to the sub-photodiodes S4 to S7, and the ninth group of detection photodiodes PG9 is switched to the sub-photodiodes S38 to S41. That is, after calibration, the processor 35 calculates the first detection signal Sc1 by summing up light energy detected by the sub-photodiodes S4 to S7, and calculates the ninth detection signal Sc9 by summing up light energy detected by the sub-photodiodes S38 to S41.

The processor 35 then identifies whether the phase shifts, after calibration, between the fifth detection signal Sc5 and the first detection signal Sc1 as well as the ninth detection signal Sc9 fulfill the predetermined requirement, i.e. compared with the first threshold and the second threshold. If the requirement is fulfilled (not exceeding the thresholds), then the Step S440 is entered.

In this embodiment, the first threshold and the second threshold are predetermined according to a number of sub-photodiodes within one group of photodiodes and a slit margin. For example, in the case that each group of photodiodes includes four sub-photodiodes (i.e., each sub-photodiode having 90 mechanical degrees) and the slit margin is 5.4 mechanical degrees, if the shift resolution is set as a half of one sub-photodiode (i.e. 45 mechanical degrees), the second threshold is selected as 50.4 mechanical degrees and the first threshold is selected as 129.6 (=2*90-45-5.4) mechanical degrees.

Similarly, in the case that each group of photodiodes includes two sub-photodiodes and the slit margin is 5.4 mechanical degrees, the second threshold is selected as 95.4 mechanical degrees and the first threshold is selected as 264.6 mechanical degrees; in the case that each group of photodiodes includes three sub-photodiodes and the slit margin is 5.4 mechanical degrees, the second threshold is selected as 65.4 mechanical degrees and the first threshold is selected as 174.6 mechanical degrees; and so on. It should be mentioned that the shift resolution is not limited to a half of the sub-photodiode.

Step S440: The processor 35 moves a second group of detection photodiodes PG2 and an eighth group of detection photodiodes PG8 respectively toward the two sides by one sub-photodiode while identifying that a second phase shift between a fifth detection signal Sc5 of the fifth group of detection photodiodes PG5 and a second detection signal Sc2 of the second group of detection photodiodes PG2 as well as a seventh phase shift between the fifth detection signal Sc5 of the fifth group of detection photodiodes PG5 and an eighth detection signal Sc8 of the eighth group of detection photodiodes PG8 are larger than or equal to the second threshold. If the above requirement is not fulfilled, the switching is not performed. For example, FIG. 5B shows that the second group of detection photodiodes PG2 is switched to the sub-photodiodes S8 to S11 (shown as PG2'), and the eighth group of detection photodiodes PG8 is switched to the sub-photodiodes S34 to S37 (shown as PG8'). That is, after calibration, the processor 35 calculates the second detection signal Sc2 by summing up light energy detected by the sub-photodiodes S8 to S11, and calculates the eighth detection signal Sc8 by summing up light energy detected by the sub-photodiodes S34 to S37.

The processor 35 then identifies whether the phase shifts, after calibration, between the fifth detection signal Sc5 and the second detection signal Sc2 as well as the eighth detection signal Sc8 fulfill the predetermined requirement, i.e. compared with the second threshold. If the requirement is fulfilled (not exceeding the threshold), then the Step S450 is entered.

Step S450: The processor 35 moves a third group of detection photodiodes PG3 and a seventh group of detection photodiodes PG7 respectively toward the two sides by one sub-photodiode while identifying that a third phase shift between a fifth detection signal Sc5 of the fifth group of detection photodiodes PG5 and a third detection signal Sc3 of the third group of detection photodiodes PG3 as well as a sixth phase shift between the fifth detection signal Sc5 of the fifth group of detection photodiodes Sc5 and a seventh detection signal Sc7 of the seventh group of detection photodiodes PG7 are larger than or equal to the second threshold. If the above requirement is not fulfilled, the switching is not performed. For example, FIG. 5B shows that the third group of detection photodiodes PG3 is switched to the sub-photodiodes S12 to S15 (shown as PG3'), and the seventh group of detection photodiodes PG7 is switched to the sub-photodiodes S30 to S33 (shown as PG7'). That is, after calibration, the processor 35 calculates the third detection signal Sc3 by summing up light energy detected by the sub-photodiodes S12 to S15, and calculates the seventh detection signal Sc7 by summing up light energy detected by the sub-photodiodes S30 to S33.

The processor 35 then identifies whether the phase shifts, after calibration, between the fifth detection signal Sc5 and the third detection signal Sc3 as well as the seventh detection signal Sc7 fulfill the predetermined requirement, i.e. compared with the second threshold. If the requirement is fulfilled (not exceeding the threshold), then the Step S460 is entered.

Step S460: The processor 35 moves a fourth group of detection photodiodes PG4 and a sixth group of detection photodiodes PG6 respectively toward the two sides by one sub-photodiode while identifying that a fourth phase shift between a fifth detection signal Sc5 of the fifth group of detection photodiodes PG5 and a fourth detection signal Sc4 of the fourth group of detection photodiodes PG4 as well as a fifth phase shift between the fifth detection signal Sc5 of the fifth group of detection photodiodes PG5 and a sixth detection signal Sc6 of the sixth group of detection photodiodes PG6 are larger than or equal to the second threshold. If the above requirement is not fulfilled, the switching is not performed. For example, FIG. 5B shows that the fourth group of detection photodiodes PG4 is still at the sub-photodiodes S17 to 20, and the sixth group of detection photodiodes PG6 is still at the sub-photodiodes S25 to S28. That is, the processor 35 still calculates the fourth detection signal Sc4 by summing up light energy detected by the sub-photodiodes S17 to 20, and still calculates the sixth detection signal Sc6 by summing up light energy detected by the sub-photodiodes S25 to S28.

If the switching is performed, the processor 35 then identifies whether the phase shifts between the fifth detection signal Sc5 and the fourth detection signal Sc4 as well as the sixth detection signal Sc6 fulfill the predetermined requirement, i.e. compared with the second threshold. If the requirement is fulfilled (not exceeding the threshold), then the Step S470 is entered.

After the Step S460, the optical encoding system 300 can reduce or even eliminate the phase shifts between detection signals caused by assembly error.

Step S470: Before using the calibrated code signals (i.e. the calibrated Sc1 to Sc9), the processor 35 preferably calibrates widths of all detection signals again using respective thresholds (identical to or different from the thresholds used in the Step S410), e.g. equal to the identical widths having 360 mechanical degrees in the Step S410.

It should be mentioned that although FIG. 5A is illustrated in the way that the optical encoding system 300 has a default setting to have a small magnification factor and the sub-photodiodes included in the photodiode group move outward while a phase difference is large enough to form the arrangement in FIG. 5B, the present disclosure is not limited thereto. In other aspects, the optical encoding system 300 has a default setting to have a large magnification factor, e.g., the longitudinal distance Z=1.0 mm, and the operating radius ROP=8.75 mm. The sub-photodiodes included in the photodiode group are preset as the arrangement in FIG. 5B, and the sub-photodiodes included in the photodiode group move inward to form the arrangement in FIG. 5A while the predetermined condition is matched (e.g., phase shifts larger than the first or second threshold).

In the first embodiment, the sub-photodiodes included in the fifth group of detection photodiodes PG5 are arranged without changing. In one aspect, the fifth group of detection photodiodes PG5 is arranged to include a single photodiode, e.g., C5 as shown in FIG. 3B.

In the first embodiment, if a number of sub-photodiodes included in one group of detection photodiodes is larger, a finer calibration effect is achieved. In another aspect, because the detection signals closer to the two sides have a larger phase shaft (e.g., referring to FIGS. 2C and 2D), the detection photodiode group closer to the two sides is divided to have less sub-photodiodes, and the detection photodiode group closer to the center is divided to have more sub-photodiodes so as to improve the calibration effect. For example, the detection photodiode groups PG4 and PG6 have eight sub-photodiodes; the detection photodiode groups PG3 and PG7 have six sub-photodiodes; the detection photodiode groups PG2 and PG8 have four sub-photodiodes; and the detection photodiode groups PG1 and PG9 and the calibration photodiode groups PGL and PGR have two sub-photodiodes, but not limited to.

Figure 6:
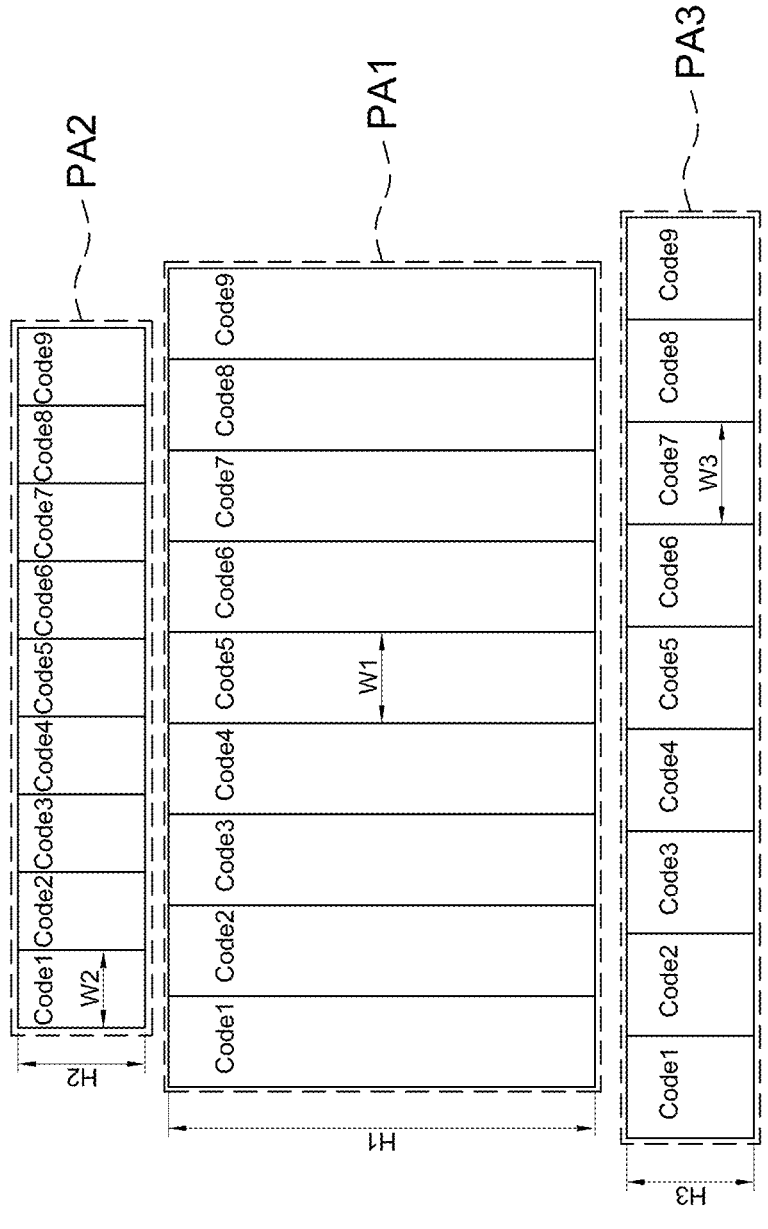
FIG. 6 is a schematic diagram of a photodiode array of an optical encoding system according to a second embodiment of the present disclosure.
Figure 7:
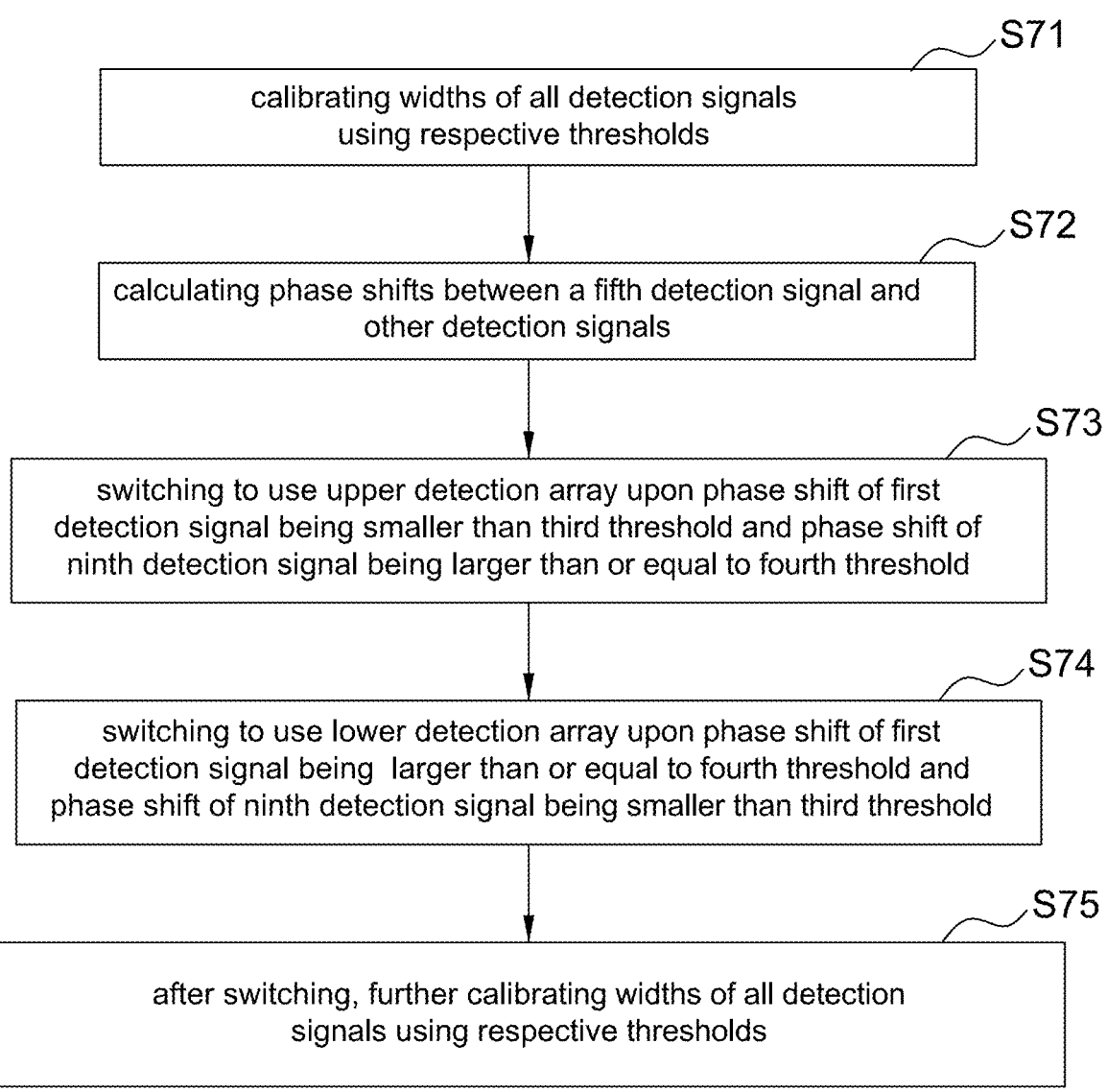
FIG. 7 is a flow chart of an operating method of an optical encoding system according to a second embodiment of the present disclosure.

Please refer to FIGS. 6 and 7, FIG. 6 is a schematic diagram of a photodiode array 313' of an optical encoding system 300 according to a second embodiment of the present disclosure; and FIG. 7 is a flow chart of an operating method of an optical encoding system 300 according to a second embodiment of the present disclosure.

In the second embodiment, the photodiode array 313' includes a first photodiode array PA1, a second photodiode array PA2 and a third photodiode array PA3 arranged along a radial direction Y, e.g., referring to FIGS. 3A and 3B. For example, the photodiodes of the first photodiode array PA1 have a first width W1, and used to received modulated light from multiple code slits 331 (e.g., referring to FIGS. 3A and 3B) to generate multiple detection signals Sc1 to Sc9 as the absolute position signals. The photodiodes of the second photodiode array PA2 have a second width W2, and are arranged at a first side (e.g., shown as upper side, but may be at lower side) of the first photodiode array PA1 along the radial direction Y, wherein the second width W2 is smaller than the first width W1. The photodiodes of the third photodiode array PA3 have a third width W3, and are arranged at a second side (e.g., shown as lower side, but may be at upper side) of the first photodiode array PA1 along the radial direction Y, wherein the third width W3 is larger than the first width W1.

Furthermore, the first photodiode array PA1 has a first height H1; the second photodiode array PA2 has a second height H2; and the third photodiode array PA3 has a third height H3. In one aspect, the first height H1 is larger than the second height H2 and the third height H3. In one aspect, the second height H2 is equal to the third height H3, but not limited to.

In the aspect using nine MLS codes, the first photodiode array PA1, the second photodiode array PA2 and the third photodiode array PA3 respectively include nine photodiodes (e.g., shown as Code1 to Code9 shown in FIG. 6) arranged along the tangential direction X (e.g., referring to FIGS. 3A and 3B).

The processor 35 identifies whether to switch to use the second photodiode array PA2 or the third photodiode array PA3 according to phase shifts between multiple detection signals Sc1 to Sc9 respectively outputted by photodiodes Code1 to Code9 of the first photodiode array PA1.

The operating method of the second embodiment includes the steps of: calibrating widths of all detection signals using respective thresholds (Step S71); calculating phase shifts between a fifth detection signal and other detection signals (Step S72); identifying whether to use an upper photodiode array (Step S73); identifying whether to use a lower photodiode array (Step S74); and after switching, further calibrating widths of all detection signals using respective thresholds (Step S75).

The Steps S71, S72 and S75 are respectively similar to the Steps S410, S420 and S470, and the difference is in that the second embodiment does not include sub-photodiodes. For example, in the Steps S71 and S75, the processor 35 uses respective thresholds corresponding to multiple photodiodes (e.g., Code1 to Code9) of the first photodiode array PA1 to be compared with light energy detected by the multiple photodiodes Code1 to Code9 to obtain square-wave signals having identical widths (360 mechanical degrees) as the multiple detection signals Sc1 to Sc9, referring to FIG. 1B. In the Step S72, the phase shifts include eight phase shifts between a fifth photodiode Code5 of the first photodiode array PA1 and the rest photodiodes Code1 to Code4 and Code6 to Code9 of the first photodiode array PA1.

The optical encoding system 300 of the second embodiment has a default setting to identify the phase shifts according to detection signals of the first photodiode array PA1 without using detection signals of the second photodiode array PA2 or the third photodiode array PA3. Meanwhile, the default setting includes the longitudinal distance Z=1.5 mm, and the operating radius ROP=9.15 mm.

In one aspect, each photodiode of the first photodiode array PA1 has a width W1, which is equal to a summation of one code slit and one slit margin, e.g., referring to FIG. 3B; each photodiode of the second photodiode array PA2 has a width W2, which is smaller than the summation of one code slit and one slit margin; and each photodiode of the third photodiode array PA3 has a width W3, which is larger than the summation of one code slit and one slit margin. The difference between the width W1 and the width W2 as well as the width W3 is determined according to the detection resolution of the system.

Step S73: The processor 35 sums up detection signals of corresponding photodiodes (i.e. Code1 indicating corresponding photodiodes; Code2 indicating corresponding photodiodes; and so on) of the first photodiode array PA1 and the second photodiode array PA2 as the absolute position signals while identifying that a first phase shift between a detection signal Sc5 of the fifth photodiode Code5 and a detection signal Sc1 of a first photodiode Code1 of the first photodiode array PA1 is smaller than a third threshold (e.g., −50.4 mechanical degrees) as well as a second phase shift between the detection signal Sc5 of the fifth photodiode Code5 and a detection signal Sc9 of a ninth photodiode Code9 of the first photodiode array PA1 is larger than or equal to a fourth threshold (e.g., 50.4 mechanical degrees), indicating a small magnification factor.

Step S74: The processor 35 sums up detection signals of corresponding photodiodes (i.e. Code1 indicating corresponding photodiodes; Code2 indicating corresponding photodiodes; and so on) of the first photodiode array PA1 and the third photodiode array PA3 as the absolute position signals while identifying that the first phase shift is larger than or equal to the fourth threshold as well as the second phase shift is smaller than the third threshold, indicating a large magnification factor.

In the second embodiment, the third threshold and the fourth threshold are set according to the second threshold mentioned in the first embodiment, but the present disclosure is not limited to. In addition, in the second embodiment the assembly error can cause the magnification factor to become larger or smaller, and positive/negative signs of the third threshold and the fourth threshold are considered to indicate the phase leading/lagging.

It should be mentioned that although the second embodiment is illustrated in that light energy summation of two photodiode arrays (e.g., first photodiode array PA1 and second photodiode array PA2, or first photodiode array PA1 and third photodiode array PA3) are both used after the switching as the multiple detection signals Sc1 to Sc9, the present disclosure is not limited to. In other aspects, the processor 35 switches to, after the switching, use multiple detection signals Sc1 to Sc9 only outputted by the second photodiode array PA2 or the third photodiode array PA3 as the absolute position signals. In this case, H1=H2=H3.

As mentioned above, the present disclosure provides an optical encoding system 300 including multiple detection photodiodes and multiple calibration photodiodes. In the default setting, the multiple detection photodiodes respectively receive modulated light from the multiple code slits 331 to generate a detection signal Sc1 to Sc9 as absolute position signals; and the detection signals of the multiple calibration photodiodes are not used or even not outputted to the processor 35. The processor 35 identifies whether to switch to use the multiple calibration photodiodes according to phase shifts between the multiple detection signals Sc1 to Sc9 generated by the multiple detection photodiodes.

For example in the first embodiment (e.g., FIGS. 4 to 5B), the multiple calibration photodiodes are respectively at two sides of the multiple detection photodiodes along the tangential direction X (i.e. a direction of arranging photodiodes). Meanwhile, each of the multiple detection photodiodes are divided into multiple sub-photodiodes, and the processor 35 further sums up light energy detected by the multiple sub-photodiodes of each of the multiple detection photodiodes to generate the multiple detection signals Sc1 to Sc9.

For example in the second embodiment (e.g., FIG. 6), the multiple calibration photodiodes are respectively at two sides of the multiple detection photodiodes (e.g., first photodiode array PA1) along a radial direction Y (i.e. perpendicular to a direction of arranging photodiodes). Meanwhile, the multiple calibration photodiodes have a first width (e.g., width W2 of the second photodiode array PA2) and a second width (e.g., width W3 of the third photodiode array PA3), and a width of the multiple detection photodiodes (e.g., width W1) is between the first width and the second width.

In other embodiments, the above first and second embodiments are combinable. For example, photodiodes of the first photodiode array PA1 in FIG. 6 are divided into multiple sub-photodiodes, as shown in FIG. 5A. When the processor 35 identifies that phase shifts exceed the above second threshold, a transverse switching is performed at first (referring to FIGS. 5A to 5B); and when the processor 35 identifies that phase shifts further exceed the above first threshold, a longitudinal switching is performed to use the second photodiode array PA2 or the third photodiode array PA3. Furthermore, photodiodes of the second photodiode array PA2 and the third photodiode array PA3 may further be divided into multiple sub-photodiodes to perform the transverse switching as FIG. 4. As long as the corresponding thresholds are preset, the optical encoding system having both transverse switching (e.g., FIG. 4) and longitudinal switching (e.g., FIG. 7) is implemented.

It should be mentioned that although the detection signals of the present disclosure are used as absolute position signals as an example, the present disclosure is not limited thereto. The arrangement of the photodiode array of the present disclosure is also adaptable to relative position signals (e.g., generated by modulated light of relative position slits) for calibrating the assembly error.

It should be mentioned that the values mentioned in the above embodiments, e.g., including distances, a number of (sub-)photodiodes, sizes, thresholds are only intended to illustrate but not to limit the present disclosure.

As mentioned above, in the absolute position encoder, the so-called absolute code jump can occur due to the phase shift between code signals caused by the position deviation in a radial direction and/or a longitudinal direction. Accordingly, the present disclosure provides an optical encoding system that has narrower sub-photodiodes formed by dividing each photodiode and/or arranging extra photodiodes in a tangential direction or a radial direction (e.g., as shown in FIGS. 5A to 5B and FIG. 6) as calibration photodiodes, which is not used before calibration. When a phase shift between detection signals outputted by the detection photodiodes of the optical encoding system of the present disclosure is large enough, the detection signals outputted by the calibration photodiodes are used to reduce or even eliminate the phase shift between the detection signals.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. An optical encoding system, comprising:
a code disk, arranged with equally-spaced multiple code slits along a tangential direction;
a photodiode array, comprising multiple groups of detection photodiodes and two groups of calibration photodiodes respectively at two sides of the multiple groups of detection photodiodes in the tangential direction, wherein the multiple groups of detection photodiodes are respectively configured to receive modulated light from the multiple code slits to generate a detection signal as absolute position signals; and
multiple switching devices, configured to switch the multiple groups of detection photodiodes to output multiple detection signals in a first detection, and to switch the two groups of calibration photodiodes to output other detection signals according to phase shifts between the multiple detection signals in the first detection.

2. The optical encoding system as claimed in claim 1, wherein each group of the multiple groups of detection photodiodes and the two groups of calibration photodiodes have multiple sub-photodiodes, and light energy detected by the multiple sub-photodiodes of the each group is summed up to generate the multiple detection signals and the other detection signals.

3. The optical encoding system as claimed in claim 2, wherein
respective thresholds corresponding to the multiple groups of detection photodiodes are compared with the summed light energy to obtain square-wave signals having identical widths as the multiple detection signals.

4. The optical encoding system as claimed in claim 1, wherein the multiple groups of detection photodiodes include 9 groups of photodiodes.

5. The optical encoding system as claimed in claim 4, wherein the phase shifts include 8 phase shifts between a fifth group of detection photodiodes and the rest groups of detection photodiodes.

6. The optical encoding system as claimed in claim 5, wherein the multiple switching devices are configured to
switch a first group of detection photodiodes and a ninth group of detection photodiodes respectively toward the two groups of calibration photodiodes by two sub-photodiodes upon identifying that a first phase shift between the fifth group of detection photodiodes and the first group of detection photodiodes as well as an eighth phase shift between the fifth group of detection photodiodes and the ninth group of detection photodiodes are larger than a first threshold, and
switch the first group of detection photodiodes and the ninth group of detection photodiodes respectively toward the two groups of calibration photodiodes by one sub-photodiode upon identifying that the first phase shift as well as the eighth phase shift are smaller than the first threshold and larger than a second threshold.

7. The optical encoding system as claimed in claim 6, wherein the multiple switching devices are further configured to
switch a second group of detection photodiodes and an eighth group of detection photodiodes respectively toward the two sides by one sub-photodiode upon identifying that a second phase shift between the fifth group of detection photodiodes and the second group of detection photodiodes as well as a seventh phase shift between the fifth group of detection photodiodes and the eighth group of detection photodiodes are larger than the second threshold.

8. The optical encoding system as claimed in claim 7, wherein the multiple switching devices are further configured to
switch a third group of detection photodiodes and a seventh group of detection photodiodes respectively toward the two sides by one sub-photodiode upon identifying that a third phase shift between the fifth group of detection photodiodes and the third group of detection photodiodes as well as a sixth phase shift between the fifth group of detection photodiodes and the seventh group of detection photodiodes are larger than the second threshold.

9. The optical encoding system as claimed in claim 8, wherein the multiple switching devices are further configured to
switch a fourth group of detection photodiodes and a sixth group of detection photodiodes respectively toward the two sides by one sub-photodiode upon identifying that a fourth phase shift between the fifth group of detection photodiodes and the fourth group of detection photodiodes as well as a fifth phase shift between the fifth group of detection photodiodes and the sixth group of detection photodiodes are larger than the second threshold.

10. An optical encoding system, comprising:
a first photodiode array, having a first width in a first direction, and configured to generate multiple detection signals as absolute position signals;
a second photodiode array, having a second width in the first direction, and arranged at a first side of the first photodiode array in a second direction perpendicular to the first direction, wherein the second width is smaller than the first width; and
a third photodiode array, having a third width in the first direction, and arranged at a second side of the first photodiode array in the second direction, wherein the third width is larger than the first width,
wherein in a first detection the first photodiode array is configured to output the multiple detection signals, and in a second detection the second photodiode array or the third photodiode array is configured to output other detection signals according to phase shifts between the multiple detection signals in the first detection.

11. The optical encoding system as claimed in claim 10, wherein the first photodiode array, the second photodiode array and the third photodiode array respectively include 9 photodiodes arranged along the first direction.

12. The optical encoding system as claimed in claim 11, wherein the phase shifts include 8 phase shifts between a fifth photodiode of the first photodiode array and the rest photodiodes of the first photodiode array.

13. The optical encoding system as claimed in claim 12, wherein
detection signals of corresponding photodiodes of the first photodiode array and the second photodiode array are summed up upon a first phase shift between the fifth photodiode and a first photodiode of the first photodiode array being smaller than a third threshold as well as a second phase shift between the fifth photodiode and a ninth photodiode of the first photodiode array being larger than a fourth threshold.

14. The optical encoding system as claimed in claim 12, wherein
detection signals of corresponding photodiodes of the first photodiode array and the third photodiode array are summed up upon the first phase shift being larger than the fourth threshold as well as the second phase shift being smaller than the third threshold.

15. The optical encoding system as claimed in claim 11, wherein the multiple detection signals are generated by receiving modulated light from multiple code slits of a code disk, and
respective thresholds corresponding to multiple photodiodes of the first photodiode array are compared with light energy detected by the multiple photodiodes to obtain square-wave signals having identical widths as the multiple detection signals.

16. The optical encoding system as claimed in claim 10, wherein
the first photodiode array has a first height in the second direction,
the second photodiode array has a second height in the second direction,
the third photodiode array has a third height in the second direction,
the first height is larger than the second height and the third height, and the second height is equal to the third height.

17. An optical encoding system, comprising:
a code disk, arranged with equally-spaced multiple code slits along a tangential direction;
multiple detection photodiodes, configured to respectively receive modulated light from the multiple code slits to generate a detection signal as absolute position signals;
multiple calibration photodiodes; and
multiple switching devices, configured to switch the multiple calibration photodiodes to output other detection signals according to phase shifts between multiple detection signals generated by the multiple detection photodiodes.

18. The optical encoding system as claimed in claim 17, wherein the multiple calibration photodiodes are respectively at two sides of the multiple detection photodiodes along the tangential direction.

19. The optical encoding system as claimed in claim 17, wherein the multiple calibration photodiodes are respectively at two sides of the multiple detection photodiodes along a radial direction perpendicular to the tangential direction.

20. The optical encoding system as claimed in claim 19, wherein
the multiple calibration photodiodes have a first width and a second width, and
a width of the multiple detection photodiodes is between the first width and the second width.

* * * * *